Patented Nov. 20, 1945

2,389,173

UNITED STATES PATENT OFFICE 2,389,173

RECOVERY OF GLYCEROL FROM FERMENTED LIQUORS

Robert Alan Walmesley, Howwood, Scotland, assignor to Imperial Chemical Industries Limited, a corporation of Great Britain No Drawing. Application August 27, 1942, Serial No. 456,423. In Great Britain June 9, 1941

1 Claim. (Cl. 260—637)

The present invention relates to the recovery of glycerol formed during the fermentation of carbohydrate material, and in particular to its recovery from the still residues left after the alcohol and other volatile products have been distilled. Depending on the nature of the material fermented, the composition of the still residues may vary considerably, but in all cases they contain a large proportion of non-volatile organic matter in relation to the amount of glycerol. Amongst the materials ordinarily present are gums and other colloidal materials, unfermented and unfermentable carbohydrates, nitrogeneous materials and salts which include potash, magnesium and calcium salts. In the still residues from material fermented under acidic conditions, referred to hereinafter as "acidic still residues," the impurities further include a high proportion of water soluble free organic acids such as acetic, tartaric, butyric, malic and succinic acids, in relation to the amount of glycerol. The presence of these various substances renders the recovery of the glycerol difficult.

It has often been attempted to assist the recovery of the glycerol by extracting the still residue concentrate with a volatile solvent and evaporating the solvent from the extract before distilling the latter to recover the glycerol. In particular it has been attempted to use alcoholic solvents for this purpose, but the results obtained have on the whole been disappointing.

It is an object of the present invention to provide an improved process for the recovery of glycerol from fermentation still residues by extraction with water soluble alcoholic solvents, and especially with ethyl alcohol or mixtures of ethyl alcohol with other alcohols. It is another object of the invention to provide a modified or improved solvent process for the recovery of glycerol. Further objects will appear hereinafter.

In various processes that have been proposed for the recovery of glycerol from fermentation residues it has been proposed to subject the material to treatment involving the addition of a succession of inorganic precipitating agents each specific to some particular type of impurity present, one or more steps of filtration of the liquid from precipitated solids, and concentration, all prior to extraction of the glycerol by means of a solvent such as alcohol from the partly purified solution so obtained. None of these processes, however, have been free from serious technical disadvantages, occasioned for instance by the difficulties experienced in filtering the precipitates, and the time consumed by the various operations, while the limited extent of the purification effected by them constitutes a disappointing reward for the trouble they involve.

It has further been proposed in French Patent No. 344,036 to recover the glycerol from vinasses or fermented molasses by a process comprising the steps of concentrating the optionally neutralised material as far as possible, cooling the concentrate, separating off the salts that thereby crystallise, working the resulting viscous liquid in a mechanical mill with about 1–1¼ times its weight of half-slaked quicklime or a mixture of quicklime with calcium sulphate, chalk or infusorial earth, sufficient of the solid being employed to yield a granulated product that is neither pitchy nor friable, extracting the glycerol from the resulting granulated porous product by treating it in countercurrent in a battery of extractors with strong alcohol, more particularly alcohol of at least 95–96 per cent, and distilling off the alcohol from the resulting extract. It is claimed that the concentrated crude glycerol so obtained is of good quality and may be refined after evaporation and filtration through animal charcoal, like glycerol from fats. It is also stated that the residue from the alcoholic extraction, after being blown free of alcohol by means of hot air or dry limekiln gases, is a dry granular product that can be used as a fertiliser. This process of purification involves a number of inconveniences and difficulties, including a high consumption of the solid powdered lime or lime mixture, the tediousness and inefficiency of extraction of glycerol from the granular mixture, the expense of the apparatus recommended, and the mechanical difficulties of handling and separating from crystallised salts a fermentation residue which has been concentrated as far as possible and cooled and is therefore excessively viscous; and more generally on account of the precautions necessary to attain and maintain the granular porous structure of the solid to be extracted, and prevent dilution of the strong alcohol employed.

I have found that an easily handled solid extraction residue may be obtained without the disadvantages referred to in the preceding paragraphs by an improved process according to which part of the purification of the glycerol in the fermentation residue is accomplished with the aid of lime and a water miscible alcohol.

In particular I have found that if a liquid still residue concentrate containing not more than half its weight of water is treated with an alkaline earth metal hydroxide in quantity merely sufficient to leave an undissolved excess, and a water miscible alcohol is introduced into the resulting cream, the greater part of the impurities can be precipitated as their alkaline earth metal compounds in a solid and easily separable condition even though these are largely soluble in water, and the formation of an alcoholic extract relatively rich in glycerol and poor in impurities is facilitated, from which product it is easy to obtain a high yield of pure glycerol.

According to the present invention, a cream is formed with a liquid fermentation still residue concentrate by admixture with a quantity of an alkaline earth material sufficient to leave an undissolved excess of alkaline earth metal hydroxide, a quantity of a water miscible alcohol sufficient to precipitate nearly all of the precipitable impurities is mixed with the resulting fluid cream, the amount of water in the system being not more than the combined weight of the glycerol and impurities, and the resulting alcoholic extract is separated from the precipitate. The glycerol in the alcoholic extract may thereafter be subjected to further purification treatment with excellent results.

In putting the invention into effect, it is convenient to employ ethyl alcohol as the water miscible alcohol, for instance in the form of methylated spirits or rectified spirits, but other water soluble alcohols or mixtures thereof may be employed. Since it is economically preferable to employ an alcohol containing a certain percentage of water rather than the anhydrous material, e. g. 90 per cent to 94 per cent alcohol it will usually be desirable to reduce the water content of the still residue concentrate to about 40 per cent or less before adding the alcohol, but it is unnecessary to evaporate sufficient water to cause salts to crystallise from it when it cools, and it is also undesirable that it should be cooled to such a temperature as to become excessively viscous. We prefer to use the concentrate at a temperature of 40–80° C. in order to maintain it as fluid as possible, and the cream obtained on the addition of the lime is also maintained at a temperature at which it is fluid until the alcoholic extraction is to be commenced.

As alkaline earth material there may be employed an alkaline earth metal oxide or hydroxide, for instance baryta, quicklime or slaked lime. The alkaline earth material and the alcohol are advantageously mechanically mixed with the more or less viscous liquid concentrate of the still residue, and the mixture may be allowed to settle so that the alcoholic extract can be decanted or otherwise separated from the solid residue that is precipitated by the alcohol. The employment of alkaline earth oxides is often very advantageous since their dehydrating effect enables the water content to be reduced to a further degree than can conveniently be attained by concentration of the still residues alone. The amount of lime required per part glycerol is somewhat variable and while there must be sufficient to leave an undissolved excess of lime there should not be employed enough to make it into a stiff paste.

While satisfactory results are obtained provided the water content in the extraction mixture does not amount to more than the combined weight of the glycerol and impurities, the amount of the water content may advantageously be considerably less than this amount.

The solid residue from which the supernatant alcoholic extract has been removed should be washed with a further quantity of alcohol, and if desired the washing and precipitation may be carried out in countercurrent stages, using the alcohol employed for washing the solid residue of one batch from which the main alcoholic extract has been removed for precipitation of the water soluble alkaline earth material in the next batch. Simple mixing apparatus may be used for these operations. It will usually be desirable that the glycerol concentration of the alcoholic extract should be about 7 to 15 per cent.

The washed residue is a nonhygroscopic granular solid which does not become sticky when heated, and may be dried off, for instance by heating it in a rotary drier. It can be used as a fertilizer or as a material for the recovery of potassium salts. The alcohol vaporised from it can be recovered.

On evaporation of the alcohol from the alcoholic extract there is obtained a crude aqueous glycerol, still containing a certain amount of impurity, which may be concentrated by further evaporation of water. The alcohol may be rectified. The glycerol concentrate may advantageously be further purified, for instance by the addition of a substantially water immiscible volatile organic nitrogen base such as aniline, separation of the resulting extract from the aqueous layer and recovery of the glycerol from the said extract by further extraction with water, as described in British Patent No. 515,831. It is an advantage of the present invention that the purity of the crude glycerine obtained by evaporation from the alcoholic extract is higher than when a simple alcoholic extraction of the still residue concentrate is carried out in known manner, with the result that the quantity of substantially water immiscible volatile nitrogen base required for the subsequent further purification for a given amount of glycerol is correspondingly reduced. Other methods of purification are, however, available, for instance the glycerol concentrate obtained from the alcoholic extract may be treated with an excess of sodium carbonate in order to precipitate the soluble alkaline earth metal salts it contains, and then distilled with steam in a vacuum.

The invention is further illustrated in the following example, in which the parts are parts by weight:

*Example*

A still residue consisting of a dealcoholised distillery slop made by a fermentation of molasses in an acid medium, is concentrated by evaporation until it contains 12.5 per cent. glycerol, 47.5 per cent. nonvolatile impurities and 40 per cent. water. 100 parts of this concentrate at 50° C. are mechanically mixed in a mill of the kind used for homogenising emulsions with 10 parts calcium oxide. The resulting thick cream is then mechanically mixed with 150 parts of cold concentrated aqueous ethyl alcohol. The ethyl alcohol for this purpose has already been used for the first washing of the precipitated solid matter from a previous batch, and this quantity of alcohol is sufficient to precipitate somewhat more than 90 per cent. of the total weight that can be precipitated by the addition of alcohol of the concentration used. The precipitated solid matter is allowed to settle and the extract is removed by decantation. The residue is washed with a further 150 parts of concentrated aqueous alcohol which has already been used for a second washing of the precipitated residue in a previous batch, and the liquid is again decanted. The precipitated residue is washed for a second time with 150 parts of ethyl alcohol, the material used for this washing being freshly rectified 94 per cent. spirit. Thus in a succession of batches 150 parts of 94 per cent. ethyl alcohol are supplied for each batch of 100 parts concentrated still residue. The solvent is distilled away from the extract richest in glycerine, and the distillate is subsequently rectified. The residual crude glycerol solution is concentrated by evaporation until it is substantially free from water. The nonaqueous portion contains about 90 per cent. of the glycerine formed in the fermentation and contains approximately 70 per cent. glycerol, 10 per cent. of organic residue not volatile at 160° C. and 20 per cent. ash. It is mixed with 5 to 10 times its weight of aniline and the mixture is heated under conditions permitting evaporation of steam to a temperature of 100 to 145° C. The resulting aniline extract is separated by decantation, cooled and washed in countercurrent fashion with about half its weight of cold water. The resulting aqueous solution of glycerol is concentrated by evaporation and yields glycerine of about 95 per cent. purity which may be distilled in a vacuum to yield 90 to 95 per cent. of its weight of refined glycerol. The overall yield of refined glycerol averages about 70 per cent. of the glycerol present in the slop.

Amongst the advantages of the invention may be mentioned the mechanical convenience of the process, occasioned by the fact that the still residue liquor requires no preliminary purification previous to its extraction with the alcohol except the treatment with the alkaline earth material, and the fact that until after the alcohol has been introduced the material that is treated has a fluid consistency while the residue on the alcoholic treatment is a powdery solid. A further advantage of the invention lies in the cheapness and small consumption of the reagents required. Thus methylated or rectified spirits may conveniently be employed as the alcohol introduced into the process. Usually 1 mol. alkaline earth material per mol. glycerol is amply sufficient.

The invention is applicable to the still residues from fermentation of many carbohydrate materials other than molasses, for instance, crude cane sugar, beet molasses, fruit musts or grain.

Although the invention has been described hereinbefore mainly with reference to the recovery of the glycerol from acidic fermentation still residues, it is also advantageous in connection with the recovery of the glycerol from still residues from other fermentation methods in which glycerol is formed, for instance, those in which the fermentation of the carbohydrate is conducted in presence of neutral or alkaline sulphites, alkali carbonates or ammonium carbonate. Such still residues are already alkaline or neutral in reaction but it is still essential to form the still residue concentrate into a cream with the alkaline earth material in order to transform the organic impurities into their alkaline earth compounds before commencing the treatment with alcohol, which causes the soluble alkaline earth compounds to be precipitated and extracts the glycerol.

In certain cases more particularly in the case of the neutral and alkaline sulphite fermentation still residues, it may be desirable to crystallise out and separate a portion of the salts from the concentrate before commencing the treatment with the alkaline earth material.

Many variations may also be made in the practice of the invention, which, however, is limited by the following claim.

I claim:

A method for the recovery of glycerol from carbohydrate fermentation still residues which comprises the steps of concentrating the still residue until it contains not more than about 40% water by evaporation with water at raised temperature, mixing with said concentrate at a temperature between 40° and 80° C. and at which it is still fluid a quantity of an alkaline earth material sufficient to form a cream containing an undissolved excess of metal hydroxide, admixing with said cream while still fluid a water miscible alcohol in quantity sufficient to form a 7–15% solution of glycerol, and separating said alcoholic solution from the residue.

ROBERT ALAN WALMESLEY.